(12) United States Patent
Hawryluk et al.

(10) Patent No.: US 6,589,014 B1
(45) Date of Patent: Jul. 8, 2003

(54) FLUID-DRIVEN TURBINE

(76) Inventors: John Hawryluk, 601 Middlesex Dr., Cinnaminson, NJ (US) 08077; Alexandra Hawryluk, 601 Middlesex Dr., Cinnaminson, NJ (US) 08077; John Michael Hawryluk, 601 Middlesex Dr., Cinnaminson, NJ (US) 08077

(*) Notice: Subject to any disclaimer, the term of this patent is extended or adjusted under 35 U.S.C. 154(b) by 31 days.

(21) Appl. No.: 10/044,928

(22) Filed: Jan. 15, 2002

(51) Int. Cl.⁷ .............................. F01D 1/02
(52) U.S. Cl. ................................. 415/202
(58) Field of Search ................. 415/202, 116, 415/76, 3.1, 203, 205, 92; 416/197 A, 197 B, 197 R; 417/405

(56) References Cited

U.S. PATENT DOCUMENTS

| | | | | |
|---|---|---|---|---|
| 3,734,638 A | * | 5/1973 | Ebsary | 415/141 |
| 4,218,176 A | * | 8/1980 | Gawne | 415/90 |
| 4,305,214 A | * | 12/1981 | Hurst | 37/67 |
| 4,923,368 A | * | 5/1990 | Martin | 415/202 |
| 5,249,923 A | * | 10/1993 | Negus | 415/202 |
| 5,947,678 A | * | 9/1999 | Bergstein | 415/3.1 |

* cited by examiner

*Primary Examiner*—Edward K. Look
*Assistant Examiner*—James M McAleenan

(57) ABSTRACT

A fluid-driven turbine for converting kinetic energy of an incompressible fluid into mechanical work energy comprising an outer cylinder enclosing a cylindrical chamber with laterally opposed inlet ports and opposed apertures, fluid supply pipe with a common inlet pipe, side pipes and associated inlet pipes, an exhaust pipe, and an inner cylinder with impellers, said inner cylinder connected to a shaft disposed within the apertures of the outer cylinder and rotating upon said shaft once fluid is delivered by the fluid supply pipe into chambers located between the outer cylinder and inner cylinder.

19 Claims, 3 Drawing Sheets

FLUID-DRIVEN TURBINE

BACKGROUND OF THE INVENTION

This version of the invention is concerned with the field of fluid-driven engine devices or turbines. More specifically, this version of the invention is concerned with turbines that are actuated with an incoming stream of pressurized fluid, which rotates an inner cylinder and shaft, which drives a secondary device, such as a generator for production of electric power or the like.

Fluid-driven devices or engines are commonly referred to as turbines, whereby the kinetic energy of a moving fluid is converted to mechanical power by the impulse, movement, or reaction of the fluid with a series of blades, impellers, or paddles arrayed about the circumference of a rotor, wheel or cylinder. Conversion of kinetic energy to mechanical energy occurs on the blades, and the method by which such conversion is accomplished distinguishes whether a turbine is an impulse or a reaction turbine. An impulse turbine, for example, is comprised essentially of an airtight case or stator, at least one rotor with a series of curved blades, said blades extending radially from the edge thereof, and a shaft onto which the rotor is affixed, said shaft disposed in rotating engagement within and supported by the stator. The rotation of the shaft with respect to the stator is assisted by a set of bearings, which are disposed between communicating sections of the shaft and stator. A series of nozzles is located within the interior of the stator around the blades with the tips of said nozzles positioned adjacent to the blades of the rotor. The nozzles direct incoming pressurized fluid to the blades, and the fluid's making contact with or impinging upon said blades rotates the blades, the rotor, and ultimately the shaft. The shaft is usually connected to a secondary device, such as a generator for production of electric power or a pump.

A reaction turbine is comprised of an airtight case or stator and at least one rotor with blades, said blades extending radially from the edge of the rotor. The rotor is affixed to a shaft, which is disposed in rotating engagement within and supported by a stator. The blades extending from the rotor are usually referred to as moving blades, and the space enclosed between any two blades and an intervening portion of the edge of the rotor resembles that of a nozzle. A series of fixed or stationary blades is located on the interior surface of the sidewall of the stator and when viewed in cross section is similar to the moving blades extending from the rotor, i.e. the space enclosed by any two fixed blades resembles that of a nozzle. Furthermore, when fluid is delivered into the stator and passed through spaces between the fixed blades, the fixed blades function as nozzles by directing the fluid to the moving blades. The moving blades respond by rotating primarily as a result of the reactive force of the fluid acting upon them, said reactive force produced by the velocity of the fluid and that when said fluid changes direction, and to a lesser extent the impulse of the fluid impinging upon or pushing the moving blades.

In some designs a turbine can be provided with a combination of impulse and reaction blades and technologies so that such a turbine can function as an impulse-reaction turbine, i.e. the rotor and blades attached thereon are rotated by the impulse movement of a of a fluid entering the stator and the reactive force of a fluid changing direction.

Over time, though, such turbines have become increasingly complex and specialized, which compromises their reliability and restricts their application to certain uses. The fluid-driven turbine that is the subject of this disclosure introduces a reaction turbine that incorporates a simplified design and is constructed with a minimum number of components in order to ensure reliability and promote adaptability to a variety of uses. The present version of the invention is distinguished over conventional turbine design and the prior art by employing an outer cylinder or stator having a continuous, curving sidewall and two opposed circular end walls, each wall having an aperture formed centrally therein. An inner cylinder with a shaft located on opposing end walls thereof is disposed within the outer cylinder with the unattached ends of the shaft extending through the apertures of the outer cylinder. Two impellers are located on opposing sides of the exterior of the inner cylinder and are disposed in parallel relation to the longitudinal axis of said inner cylinder. Each impeller is formed with a concave surface and an opposed convex surface. A leading edge of the impeller located distally from the exterior of the sidewall makes slight contact with the interior surface of the outer cylinder. A fluid supply pipe is affixed to the outer cylinder, said supply pipe consisting of an inlet pipe, diverging pipe, two side pipes with a series of inlet pipes extending therefrom. The inlet pipes communicate with inlet ports located within the sidewall of the outer cylinder. The number of inlet pipes on a first side pipe is unequal to that of the number of inlet pipes on a second side pipe. An outlet pipe is attached to the exterior of the outer cylinder and communicates with an outlet port formed into the sidewall of the outer cylinder. Incompressible liquid flows under slight pressure through the fluid supply pipe and is delivered into the interior of the outer cylinder through the inlet pipes and cooperating inlet ports of the outer cylinder. As the number of inlet pipes on each side of the outer cylinder is not equal, fluid is thus delivered into the outer cylinder at differing velocity and static pressure on each side thereof, thereby resulting in an imbalance of force acting upon the impellers, which functions to trigger and sustain rotation of the inner cylinder. Liquid that has expended kinetic energy is exhausted through the outlet port and pipe and replaced with an identical amount of liquid from the fluid supply pipe.

SUMMARY OF THE INVENTION

The present version of the invention, which will be described in greater detail hereinafter, relates to the field of fluid-driven engine devices or turbines. More specifically, this version of the invention is concerned with turbines that are actuated with an incoming stream of pressurized fluid, which rotates an inner cylinder and shaft, which drives a secondary device, such as a generator for production of electric power or the like. My version of the invention overcomes all of the shortcomings listed previously, in addition to novel aspects that will be described in detail hereinafter.

Described briefly, according to a typical embodiment, the invention presents a fluid-driven engine device that operates as a fluid-driven turbine by converting the kinetic energy of a pressurized fluid into mechanical work or power for use by a secondary device, such as an electric generator. The device is comprised of an outer cylinder, fluid supply pipe, and inner cylinder with integral shaft. The outer cylinder is comprised of a sidewall and two end walls with an aperture formed within the center of each end wall. A series of apertures or ports is located in the sidewall of the outer cylinder, said ports disposed within two laterally opposed rows with a first row of said ports having at least one more port than a second row of ports. Additionally, an exhaust port is fabricated into the sidewall adjacent to one of the intake ports. An outlet pipe is affixed to the outer cylinder over the exhaust port.

The fluid supply pipe consists of a common inlet pipe, diverting pipe, and two side pipes. The side pipes are attached to the exterior of the outer cylinder by inlet pipes, which extend from the side pipes for some distance and are attached to the exterior of the outer cylinder over cooperating ports. The fluid supply pipe delivers pressurized fluid to opposing sides within the interior of the outer cylinder.

The inner cylinder is comprised of a continuous curving sidewall and two circular end walls located at opposing ends of the sidewall. The shaft, extending from the end walls of the inner cylinder, is disposed within the apertures of the end walls of the outer cylinder so that the inner cylinder and shaft can rotate with respect to the outer cylinder. A pair of impellers is attached to or constructed integrally with the sidewall of the inner cylinder at opposing locations thereon. The impellers are aligned in parallel relation to the longitudinal axis of the inner cylinder. Each impeller is comprised a convex surface, an opposed concave surface, and a leading edge that makes slight, frictional contact with the inner surface of the sidewall of the outer cylinder. As pressurized fluid enters the fluid supply pipe and is delivered into the interior of the outer cylinder via the inlet pipes and cooperating inlet ports, the fluid makes contact with the impellers and urges against said impellers. As the number of ports within the first row of ports is unequal to the number of ports within the second row of ports, the fluid is delivered into the interior of the outer cylinder at an asymmetrical velocity and static pressure. The imbalance of fluid velocity and static pressure causes the inner cylinder and shaft to rotate with respect to the outer cylinder. As the rotation of the inner cylinder accelerates, the motion of the fluid revolves around said cylinder in a spiral motion towards the exhaust port, at which point it discharges from the outer cylinder. Various secondary devices, which can be attached to the shaft, are thus powered by rotation of said shaft for generation or production of usable power.

My invention, therefore, resides not in any one of these features per se, but rather in the particular combination of all of them herein disclosed. It is distinguished from the prior art in this particular combination of all of its structures for the functions specified. In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention and that such equivalent methods and structures do not depart from the spirit and scope of the invention.

OBJECTS OF THE INVENTION

Accordingly, it is an object of my version of the invention to provide a low-cost, easy-to-manufacture, and easy-to-market fluid-driven turbine.

A further object of my version of the invention is to provide an easy-to-use and versatile fluid-driven turbine.

A significant object of the invention is to provide a fluid-driven turbine or turbine that is comprised of a first, outer cylinder with continuous, curving sidewall and circular end walls located at opposing ends thereof, each end wall containing a centrally-located aperture, two rows of laterally opposed inlet ports formed within the sidewall with a first row containing at least one more port than a second row; an inner cylinder with integral shaft and two impellers located in opposition on the exterior sidewall of said inner cylinder, said impellers comprised of opposed concave and convex surfaces and a leading edge located at the unattached end of each impeller, said inner cylinder designed to rotate with respect to said outer cylinder in response to delivery of pressurized fluid to the interior of the outer cylinder via a fluid supply pipe for generation of electrical or mechanical power produced by a device or apparatus attached to one end of said shaft as it rotates.

A final but very significant object of the invention is to provide a fluid-driven turbine that is simplified in design and constructed with a minimum number of components so as to ensure reliability of operation and applicability to a variety of uses.

For a better understanding of the invention, its operating advantages and the specific objects attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention illustrated by the accompanying drawings.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

10 Fluid-driven Turbine
12 Outer Cylinder

14 Shaft
16 Fluid Supply Pipe
18 Sidewall
20 End Wall
22 Outlet Pipe
24 Outlet Port
26 Common Inlet Pipe
28 Diverging Pipe
30a Side Pipe
30b Side Pipe
32 Inlet Pipe
34 Inlet Port
36 Aperture
38 Inner Cylinder
40 Sidewall
42 End Wall
44 Impeller
46 Convex Surface
48 Concave Surface
50 Leading Edge

DETAILED DESCRIPTION OF THE PREFERRED EMBODIMENT

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
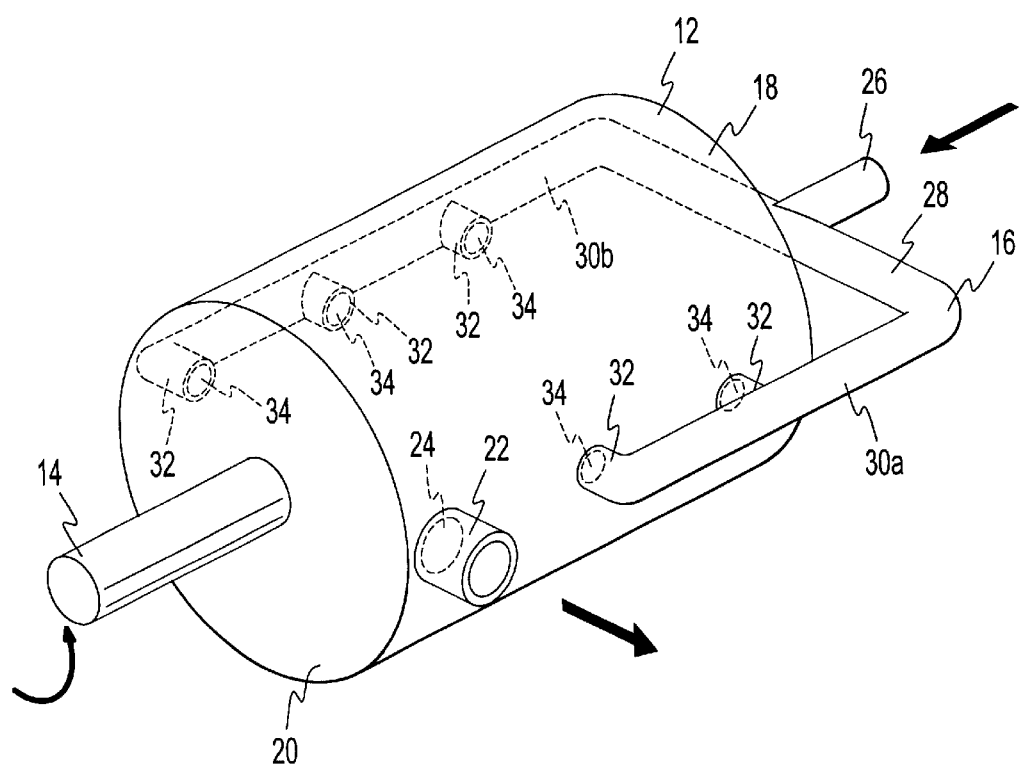
FIG. 1 is a perspective view of a fluid-driven turbine in accordance with the present version of the invention displaying a hollow outer cylinder with a fluid supply pipe and outlet pipe attached thereon and a shaft extending from opposed sidewalls of the outer cylinder.

Referring now to the drawings and, in particular, to FIG. 1 wherein there is illustrated a typical embodiment of the fluid-driven turbine 10. The present version of the invention 10 consists in part of an outer cylinder 12, shaft 14, and fluid supply pipe 16. The outer cylinder 12 is comprised of a continuous, curving sidewall 18, and two opposed circular end walls 20. An outlet pipe 22 is located on the exterior of the sidewall 18 of the outer cylinder 12 along the longitudinal axis thereof and communicates with an outlet port 24 formed into the sidewall 18. The fluid supply pipe 16 consists of a common inlet pipe 26, diverging pipe 28 perpendicularly attached to the inlet pipe 26, and two side pipes 30a, b, that extend in perpendicular relation to the diverging pipe 28 and in parallel to the longitudinal axis of the outer cylinder 12. Inlet pipes 32 extend in perpendicular relation from the side pipes 30a, b and are attached to the sidewall 18 of the outer cylinder 12. Each inlet pipe 32 communicates with a corresponding inlet port 34 formed into the sidewall 18. The number of inlet pipes 32 and corresponding ports 34 associated with one side pipe 30b exceeds by one the number of inlet pipes 32 and corresponding ports 34 associated with another side pipe 30a. In this version of the invention 10, five inlet pipes 32 and inlet ports 34 are illustrated with two pipes 32 and ports 34 being supplied by a first side pipe 30a and three pipes 32 and ports 34 being supplied by a second side pipe 30b, although any number of number of inlet pipes 32 and ports 34 may be used and remain within the spirit and scope of the invention 10, provided that the number of inlet pipes 32 and ports 34 of a first side pipe 30a, b exceeds the number of inlet pipes 32 and ports 34 of a second side pipe 30a, b. As such, the unequal number of inlet pipes 32 and ports 34 causes fluid to enter the interior of the outer cylinder 12 at differing velocity and static pressure, thereby by creating an imbalance of pressure within the outer cylinder 12, which causes an inner cylinder and the shaft 14 to rotate. As revealed by the directional arrow at the common inlet pipe 26, pressurized fluid enters the inlet pipe 26 and is delivered to the interior of the outer cylinder 12 by the diverging pipe 28, side pipes 30a, b, and inlet pipes 32 and cooperating ports 34. The fluid is discharged through the exhaust outlet pipe 22 and port 24 after reacting with the interior components of the outer cylinder 12 and rotating the shaft 14 as will be described later.

Figure 2:
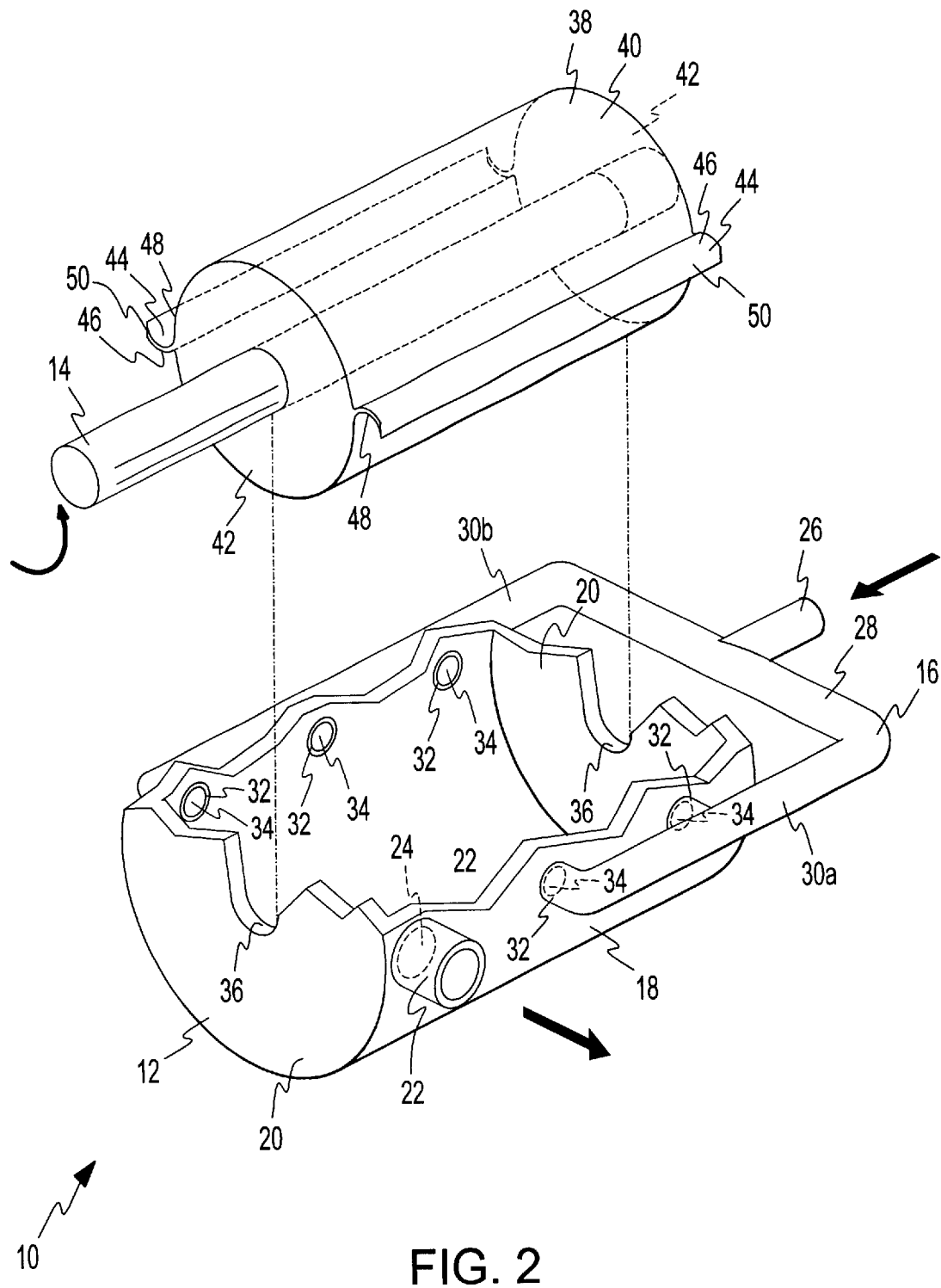
FIG. 2 is perspective view of a fluid-driven turbine illustrating an inner cylinder with laterally opposed impellers and shaft, said inner cylinder rotatingly disposed within the outer cylinder, said outer cylinder displayed in fragmentary view.
Figure 3:
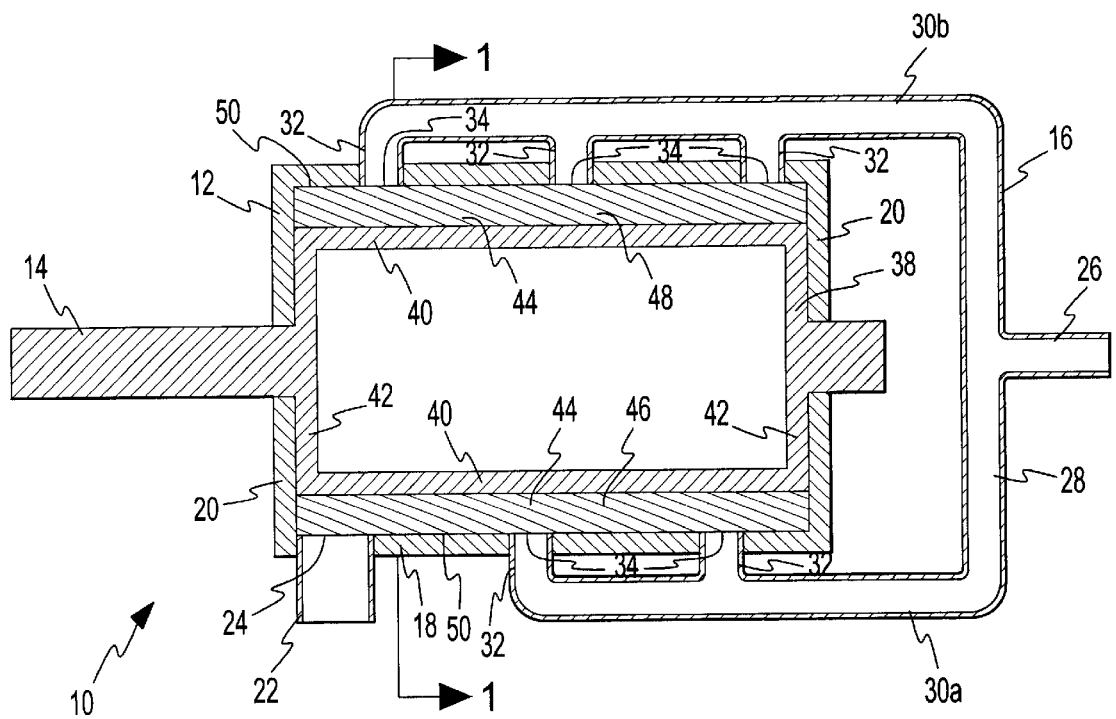
FIG. 3. is a cross-sectional view of a fluid-driven turbine taken along the longitudinal axis thereof.
Figure 4:
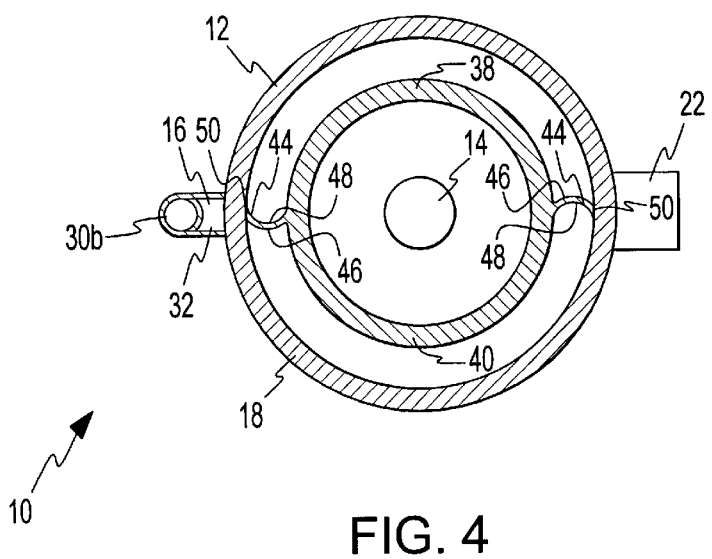
FIG. 4. is a partial cross-sectional view of a fluid-driven turbine taken along line 1—1 of FIG. 3.

Referring to FIG. 2 and FIG. 3, therein illustrated are the components and construction of the interior of the fluid-driven turbine 10. The outer cylinder 12 has one aperture 36 located centrally in each end wall 20 thereof and receives in rotating arrangement the shaft 14. The shaft 14 may be affixed within the apertures using ball-bearing devices that reduce rotation friction and prevent the transmission of air or fluid into or from the interior of the outer cylinder 12. The shaft 14 is affixed to or fabricated integrally with an inner cylinder 38. The inner cylinder 38 is comprised of a continuous curving sidewall 40 and two laterally opposed circular end walls 42, which enclose a cylindrical chamber. The shaft 14 is located at the medial portion of the end walls 42 and extends in parallel relation to the longitudinal axis of the cylinder 38 beyond the exterior surface of the end walls 42 thereof for some distance. Two narrow, elongate impellers 44 are formed onto or attached to the outer surface of the sidewall 40 at opposing locations along the longitudinal axis thereof. As such, the impellers 44 are disposed in coplanar relation to the shaft 14. Each impeller 44 consists of opposed convex surface 46 and concave 48 surfaces and a leading edge 50, which makes slight frictional contact with the inside surface of the outer cylinder 12, as shown in cross sectional views in FIG. 3 and FIG. 4.

Referring again to FIG. 3 and FIG. 4, the inner cylinder 38 has a length similar to or identical to that of the distance between the inner surfaces of the end walls 20 of the outer cylinder 12 and of a width or rotational diameter comprised of the distance between the leading edges 50 of the impellers 44, which is similar or identical to that of the inner diameter of the sidewall 18 of the outer cylinder 12. Two chambers are thus formed between the outer surface of the continuous curving sidewall 40 and facing convex 46 and concave 48 surfaces of the impellers 44 of the inner cylinder 38 and corresponding interior surfaces of the continuous curving sidewall 18 and end walls 20 of the outer cylinder 12.

As pressurized fluid enters the fluid supply pipe 16 at the common inlet pipe 26 and is delivered into the interior of the outer cylinder 12 via the side pipes 30a, b and respective inlet pipes 32 and ports 34, the fluid makes contact with the outer surface of the sidewall 40 and facing convex 46 and concave 48 surfaces of the impellers 44 of the inner cylinder 38 and a corresponding portion of the interior surface of the sidewall 18 and end walls 20 of the outer cylinder 12, occupies the cavities or spaces bounded by said surfaces, and urges against respective convex 46 and concave surfaces 48 of the impellers 44. As the fluid enters and occupies a first chamber under static and velocity pressures different than the static and velocity pressure of fluid entering and occupying a second chamber because of the unequal number of inlet pipes 32 and ports 34 associated with the side pipes 30a, b, the pressure imbalance thus created causes the inner cylinder 38 and shaft 14 to rotate as indicated by the directional arrow of FIG. 2. The rotation of the inner cylinder 38 with respect to the outer cylinder 12 eventually creates a spiral effect or vortex, which draws the fluid towards the outlet port 24 at which point the fluid is discharged from the device 10 through the outlet pipe 22 after its kinetic energy has been transformed to mechanical work energy by reaction with the impellers 44. The leading edges 50 of the impellers 44, making slight frictional contact with the interior surface of the sidewall 18 of the outer cylinder 12, prevent fluid from being transferred between the chambers and thus function to maintain the pressure imbalance between the two chambers as the inner cylinder 38 rotates. The shaft 14 can be attached to various power generating devices, which produce of a variety of mechanical or electric energy upon rotation of said shaft 14.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. The invention is intended to incorporate other embodiments including but not limited to side pipes with of inlet pipes and associated inlet ports formed into the sidewall of the outer cylinder of various quantity provided that a first side pipe has at least one more inlet pipe with associated port than a second side pipe, and an impeller with more than two impellers.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

CONCLUSION AND SCOPE OF INVENTION

From the foregoing, it will be understood by persons skilled in the art that an improved fluid-driven turbine has been provided. The invention is relatively simple and easy to manufacture, yet affords a variety of uses. While my description contains many specificities, these should not be construed as limitations on the scope of the version of the invention, but rather as an exemplification of the preferred embodiments thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While the invention has been described in connection with the preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A fluid-driven turbine for converting kinetic energy of an incompressible fluid to mechanical work energy comprising:
    (a) an outer cylinder enclosing a cylindrical chamber and having a continuous curving sidewall, circular end walls located at opposing ends of the sidewall, an aperture located medially within each end wall, two rows of inlet ports located within the sidewall with a first row disposed in opposing relation to a second row, and an outlet port located within the sidewall;
    (b) a shaft that is disposed within the apertures of the end walls of the outer cylinder, said shaft having opposed outer ends and extending in sealed, rotating arrangement within the apertures of each end wall for connection to a power generating means;
    (c) a fluid supply pipe having a common inlet pipe, diverging pipe, and side pipes with side pipes connected to the outer cylinder at the rows of inlet ports thereof;
    (d) an outlet pipe attached to the sidewall of the outer cylinder over the outlet port thereof;
    (e) an inner cylinder enclosing a cylindrical chamber and having a continuous curving sidewall with laterally opposed impellers located thereon, circular end walls located at opposing ends of the sidewall, said end walls connected to one end of the shaft; and
    (f) said inner cylinder being rotated upon the shaft within said outer cylinder once fluid is delivered through the fluid supply pipe into chambers located between said inner cylinder and said outer cylinder at unequal static and velocity pressures, said fluid impinging upon the impellers at unequal pressures and rotating said inner cylinder and being discharged through the outlet pipe once kinetic energy of said fluid has been expended and converted to mechanical work energy.

2. A fluid-driven turbine as recited in claim 1, wherein a first row of inlet ports located in the continuous curving sidewall of said outer cylinder has at least one more inlet port than a second row of inlet ports located in the sidewall of said outer cylinder.

3. A fluid-driven turbine as recited in claim 2, wherein the continuous curving sidewall of the outer cylinder has at least five ports, said ports defined by a first row of three ports disposed in lateral opposition to a second row of two ports.

4. A fluid-driven turbine as recited in claim 1, wherein the common inlet pipe of the fluid supply pipe is connected to the diverging pipe in perpendicular relation, the two side pipes are connected in perpendicular relation at a first end to opposed ends of the diverging pipe, and a plurality of inlet pipes is attached perpendicularly to the side pipes along a surface thereof facing the outer cylinder.

5. A fluid-driven turbine as recited in claim 4, wherein the common inlet, diverging pipe, side pipes, and inlet pipes of the fluid supply pipe are disposed along a common plane.

6. A fluid-driven turbine as recited in claim 4, wherein the inlet pipes are connected to the sidewall of the outer cylinder over cooperating inlet ports.

7. A fluid-driven turbine as recited in claim 6, wherein the number of inlet pipes corresponds to the number of inlet ports and the number of inlet pipes of a first row of side pipes has at least one more inlet pipe than that of a second row of side pipes.

8. A fluid-driven turbine as recited in claim 7, wherein the unequal number of inlet pipes and inlet ports between the two rows of side pipes delivers fluid into the chambers located between the outer cylinder and inner cylinder of the turbine at differing static and velocity pressures.

9. A fluid-driven turbine as recited in claim 8, wherein the chambers located between the outer and cylinders are bounded by the inner surfaces of the curving sidewall and end walls of outer cylinder, cooperating outer surface of the curving sidewall of the inner cylinder, and the impellers.

10. A fluid-driven turbine as recited in claim 1, wherein the impellers are located on opposing sides of the continuous sidewall of the inner cylinder and are disposed in parallel relation to each other and to the longitudinal axis of the inner cylinder.

11. A fluid-driven turbine as recited in claim 1, wherein the impellers are comprised of opposed convex surface and concave surfaces.

12. A fluid-driven turbine as recited in claim 11, wherein a flat leading edge is located on the impellers at an unattached end thereof between the opposed convex and concave surfaces.

13. A fluid-driven turbine as recited in claim 12, wherein the unattached end disposed between opposed convex and concave surfaces of each impeller is located in parallel relation to the longitudinal axis of each impeller.

14. A fluid-driven turbine as recited in claim 12, wherein the flat leading edge of the impeller makes slight frictional contact with the inner surface of the continuous sidewall of the outer cylinder.

15. A fluid-driven turbine as recited in claim 1, wherein:
   (a) the continuous curving sidewall of the outer cylinder has two rows of inlet ports located thereon with a first row of inlet ports disposed in opposing relation to a second row of inlet ports, said first row of inlet ports having at least one more port than a said second row of inlet ports;
   (b) the fluid supply pipe has a common inlet pipe, diverging pipe, side pipes, and inlet pipes, said inlet pipes attached at one end to the side pipes and at a second end to the sidewall of the outer cylinder over corresponding inlet ports;
   (c) the impellers are located on the sidewall of the inner cylinder in parallel relation to each other and to the longitudinal axis of the inner cylinder, said impellers having opposed convex and concave surfaces with a flat leading edge disposed between the opposed convex and concave surfaces at the unattached end of the impellers, said unattached end extending in parallel to the longitudinal axis of the impellers and inner cylinder; and
   (d) the chambers located between the inner and outer cylinder are bounded by the inner surfaces of the curving sidewall and end walls of the outer cylinder, cooperating outer surface of the curving sidewall of the inner cylinder, a concave surface of a first impeller, and a convex surface of a second impeller, said chambers containing fluid when delivered therein by the inlet ports and cooperating inlet pipes of the fluid supply pipe.

16. A fluid-driven turbine as recited in claim 15, wherein fluid delivered by a first row of inlet pipes and corresponding inlet ports into a first chamber disposed between the outer and inner cylinder is delivered at a static and velocity pressure unequal to the static and velocity pressure of fluid delivered into a second chamber between the outer and inner cylinder by a second row of inlet pipes and corresponding inlet ports.

17. A fluid-driven turbine as recited in claim 16, wherein the fluid delivered into the first and second chambers under unequal pressure impinges upon the impellers and causes the inner cylinder and shaft to rotate, respectively, within the outer cylinder and apertures located in the end walls of said outer cylinder.

18. A fluid-driven turbine as recited in claim 15, wherein the flat leading edge of the impellers prevents fluid delivered into the chambers located between the inner and outer cylinders from being transferred from a first chamber into a second chamber or vice versa as the inner cylinder rotates within the outer cylinder, thereby maintaining an imbalance of pressure between the two chambers and ensuring continued rotation of the inner cylinder.

19. A fluid-driven turbine as recited in claim 15, wherein the rotation of the inner cylinder and impellers thereof creates a vortex effect, which functions to expel fluid through the outlet port located in the outer sidewall of the outer cylinder once said fluid has converted kinetic energy to mechanical energy.

\* \* \* \* \*